(12) United States Patent
Mueller et al.

(10) Patent No.: US 8,668,421 B2
(45) Date of Patent: Mar. 11, 2014

(54) METHOD AND DEVICE FOR MANUFACTURING CONTAINER BODIES FROM METAL SHEET

(75) Inventors: Willi Mueller, Oberwil-Lieli (CH); Daniel Dietrich, Hittnau (CH)

(73) Assignee: Soudronic AG, Bergdietikon (CH)

( * ) Notice: Subject to any disclaimer, the term of this patent is extended or adjusted under 35 U.S.C. 154(b) by 733 days.

(21) Appl. No.: 12/765,031

(22) Filed: Apr. 22, 2010

(65) Prior Publication Data

US 2010/0272542 A1 Oct. 28, 2010

(30) Foreign Application Priority Data

Apr. 22, 2009 (CH) .................................. 0634/09

(51) Int. Cl.
*B21D 51/26* (2006.01)
*B23K 1/16* (2006.01)

(52) U.S. Cl.
USPC .................................. 413/74; 413/75; 219/64

(58) Field of Classification Search
USPC .................. 413/71, 72, 74–77; 219/59.1, 64, 219/81–83, 108
See application file for complete search history.

(56) References Cited

U.S. PATENT DOCUMENTS 4,714,816 A * 12/1987 Pazzaglia ...................... 219/109
5,841,094 A * 11/1998 Baumgartner .................. 219/81

* cited by examiner

*Primary Examiner* — Debra Sullivan
(74) *Attorney, Agent, or Firm* — McCormick, Paulding & Huber LLP

(57) ABSTRACT

In the field of manufacturing container bodies by means of resistance seam welding machines, at least a disturbance variable is collected, particularly errors in cutting the metal sheet. Because of this collection of disturbance variables, at least a control variable is automatically changed in order to compensate or to diminish the influence of the disturbance variable on the welding seam quality.

13 Claims, 4 Drawing Sheets

| Disturbance variable | Actuators | | | | |
|---|---|---|---|---|---|
| | Z-rail/ Head piece -displacement | Tool position -displacement | Calibration rollers -radial displacement -Roller force variation | Welding force -variation | Welding current -Variation -variation of welding spots distance |
| Sheet metal cut | SE Fig. 3a | Fig. 3b | Fig. 3c | Fig. 3e Fig. 3d | |
| Tinning | | | | | |
| Sheet metal thickness | | | | | |
| Welding range | | | | | |
| Electrical surface resistance | | | | | |
| Yield point | | | | | |
| Overlapping | | | | | |
| Temperature of electrodes | | | | | |
| Temperature of calibration tool | | | | | |

FIG. 3

Calibration rollers -radial displacement

Calibration rollers -force variation

Welding force -variation

METHOD AND DEVICE FOR MANUFACTURING CONTAINER BODIES FROM METAL SHEET

CROSS REFERENCE TO RELATED APPLICATIONS

This application claims the priority of Swiss patent application 0634/09, filed Apr. 22, 2009, the disclosure of which is incorporated herein by reference in its entirety.

BACKGROUND

The invention relates to a method and a device for manufacturing container bodies from metal sheet, particularly from tinned metal sheet, wherein rounded body blanks with overlapping edges are fed into a calibration tool and are subsequently welded by means of roller seam welding with a controlled or regulated welding current respectively.

PRIOR ART

Methods of the type mentioned above and devices or resistance seam welding machines respectively for their implementation are known. They particularly allow the adjustment of the welding current by means of welded test bodies. The welding result may be affected in a negative way when influences on the manufacturing method change; an operator of a manufacturing line for container bodies may however barely detect, without having special know-how, which influences lead to the negative result.

SUMMARY OF THE INVENTION

Hence it is a general object of the invention to improve on the method and the device for a resistance seam welding machine for manufacturing container bodies.

This object is met by automatically collecting at least one disturbance variable which affects welding seam quality and by automatically compensating the influence of the disturbance variable on the welding seam quality by means of at least one control variable.

Thereby, an "adaptive" manufacturing method results, wherein disturbance variables are detected and as much as possible compensated by means of suitable control variables, such that a continuous welding seam quality is assured. Even an operator of the method or the device respectively with little experience in welding technology and without specific knowledge about the system characteristics of the manufacturing device and of the material to be processed may thereby carry out the manufacturing in an optimum way. The control variables or the production parameters respectively are automatically adjustable by means of actuators and thereby the production parameters are traceable and reproducible.

Particularly advantageous embodiments of the method and of the device are also defined.

BRIEF DESCRIPTION OF THE DRAWINGS

The invention will be better understood and objects other than those set forth above will become apparent when consideration is given to the following detailed description thereof. Such description makes reference to the annexed drawings, wherein:

FIG. 3 shows a table with disturbance variables and respective control variables to be applied.

DETAILED DESCRIPTION OF THE INVENTION

Figure 1:
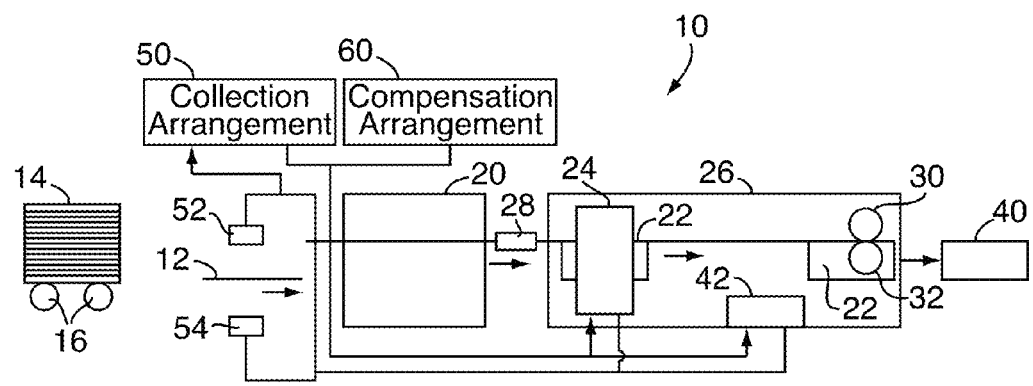
FIG. 1 is a schematic illustration of a can body making device which incorporates the present invention.
Figure 2:
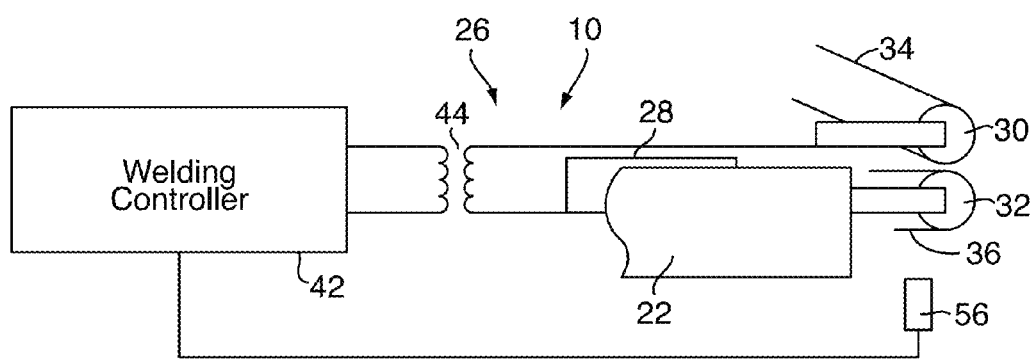
FIG. 2 is a detailed schematic illustration of the welding apparatus in the can body making device of FIG. 1.

In the following description of a device and process for making cans, can bodies are made from blanks of sheet material. FIGS. 1 and 2 schematically show a can body making device 10 and the welding apparatus 26 within the device 10. In conventional form the device 10 is an electrical resistance welding machine as described for example in U.S. patent application Ser. No. 12/464,908 filed May 13, 2009 by the Assignee. Single sheet metal blanks 12 are de-stacked from a stack 14 by a de-stacker 16. A single blank 12 taken from the stack 14 is shown being conveyed by a transport device, not shown but well known to those skilled in the art, to a rounding apparatus 20 which bends the flat blank into a rounded can body blank 22. The body is usually rounded directly into a Z-rail 28 in which the facing edges of the rounded blank 22 are brought in an overlapping or abutting relation. This body blank 22 is further conveyed by the same or a different transport device, such as a belt drive or a chain drive having transport fingers, to a calibration tool 24 of the welding apparatus 26 with a plurality of calibration rollers and then to the welding rollers of the welding apparatus 26. The edges are then welded by welding rollers 30, 32 to form the can body 40. FIG. 2 shows a rounded blank 22 that is ready to be inserted between the welding rollers 30, 32 for welding by the wire electrodes 34, 36 running over the electrodes 30, 32 respectively. Welding current is supplied from the welding controller 42 through a transformer 44.

In accordance with the present invention, the welding device as shown in FIG. 1 has a collection arrangement 50 for collecting disturbance variables from various portions of the welding device. The data is collected through sensors or detectors such as sensors 52, 54 in FIG. 1 and sensor 56 at the welding station in FIG. 2. The variables may include: characteristics of the body material of a blank 12 or body 22 such as the geometry and strength of the sheet metal or the presence of brows, tinning of the edge zones, electrical surface resistance and rounding of the blank, and for characteristics of the welding such as the temperature of welding and the overlap of the edges to be welded.

Further, the welding device in FIG. 1 has a compensation arrangement 60 connected with various portions of the welding device to change or adjust the welding process to compensate for the influence of the disturbance variables on the weld seam quality by means of a control variable.

The known welding process is primarily regulated by the welding current. In case of roller seam resistance welding of container bodies, the correct welding current depends on the characteristics of the body material, on the geometry of the rounded bodies, on the physical characteristics and the position of the welding electrodes and, in the presence of intermediary wire electrodes, on the characteristics of the wire system. Furthermore, it depends on the natural oscillation of the welding system and on the primary welding parameters, like the shape of the welding current and the dot pitch of the consecutive welding spots. Additionally, it has to be taken care of machine parameters of the welding device or the roller seam resistance welding machine, respectively, like welding speed, isolation degree and the size of the welding window. In the production of container bodies, some of the said influencing parameters are variable, particularly the body material and dimensions of the body material after cutting of the blanks. These and other disturbance variables influence the quality of the welding seam.

The table of FIG. 3 mentions the disturbance variables in the left column, which are automatically collected by means of appropriate sensors, and it shows in the five columns to the right of the left column the control variables which are mechanically influenced by appropriate actuators or which are adjusted electronically (rightmost column) in case of the welding current or the welding spot distance, respectively.

On line 1 of the table, the metal sheet cutting is mentioned as a first disturbance variable which has an influence on the welding seam quality of the container bodies. The single metal sheets for the container bodies are cut out of large metal sheet plates by means of metal sheet shears. The characteristics of the metal sheet cutting disturbing the quality of the welding seam are particularly geometry errors (deviations of the cutting from the rectangular or square desired shape) or the presence of brows at the cutting edges. As sensors or sensing steps for the detection of such disturbance variables the periodical measurement of cut metal sheets after the cutting process is done during the cut of metal sheets and in particular the offline measurement of individual metal sheets or the continuous measurement after the cut. The measurement takes place mechanically or contactless, for example optically. However, it is also possible to determine geometry errors by means of a force measurement at a calibration roller in the calibration tool of the resistance welding machine. The following control variables are used as control variables for the compensation of the disturbance variable "metal sheet cutting", either for themselves or in arbitrary combinations:

(i) The Z-rail of the resistance welding machine or at least its head part is displaced. In FIG. 3, the lower arm of the roller seam resistance welding machine and the lower welding roller are indicated in line 1 (the line with the left-hand disturbance variable "sheet metal cut" is counted as line 1) and column 1 (the column with the actor "Z-rail/head piece displacement" is counted as column 1) of the table only as a symbol for this kind of actuation. Instead of this symbolic representation a simple cross could be indicated in this box of the table to represent the fact that the disturbance variable "sheet metal cut" is compensated by Z-rail displacement. The front end of the Z-rail or its head part respectively, in case of a separate head part, is also indicated. The Z-rail is either displaced as a whole or its head part is displaced horizontally and/or vertically (related to the surface of the ground level of the welding machine), as can be seen by the arrows added in FIGS. 3 and 3a, in order to compensate the disturbance variable "metal sheet cut". A piezo-electrical actuator is for example used as an actuator for the displacement, because only very small displacement amounts are necessary.

(ii) The position of the calibration tool of the roller seam resistance welding machine is displaced additionally or alternatively; this as well in horizontal and/or vertical direction (related to the surface of the ground level of the welding machine). An actually known tool is indicated symbolically in FIG. 3 in line one and the second column of the table and also in FIG. 3b. Instead of this symbol, a simple cross could be indicated in the table to indicate that the disturbance variable "metal sheet cut" is compensated by displacement of the calibration tool. The displacement is carried out mechanically by means of actuators which are not shown and don't need to be shown for the skilled person since such actuators are well known, which are for example electromotive actuators or piezo-electrical actuators or pneumatic actuators, in order to compensate the disturbance variable "metal sheet cut" as much as possible.

Figure 3A:
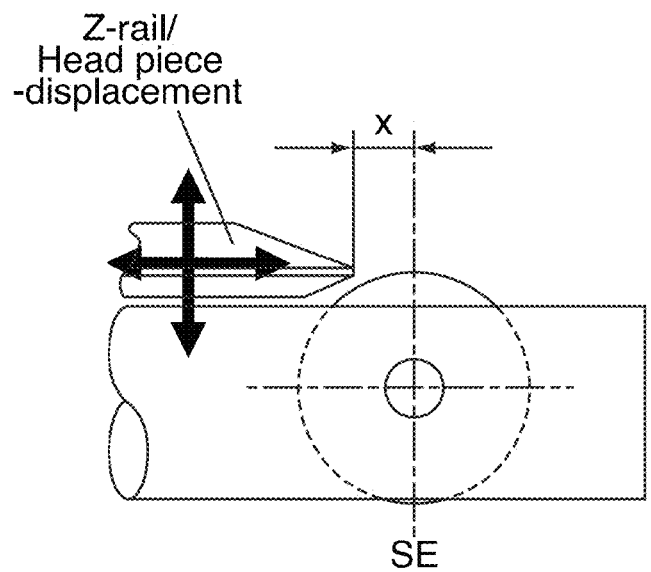
FIGS. 3a-3e illustrate the control variables of FIG. 3 at enlarged scale.
Figure 3B:
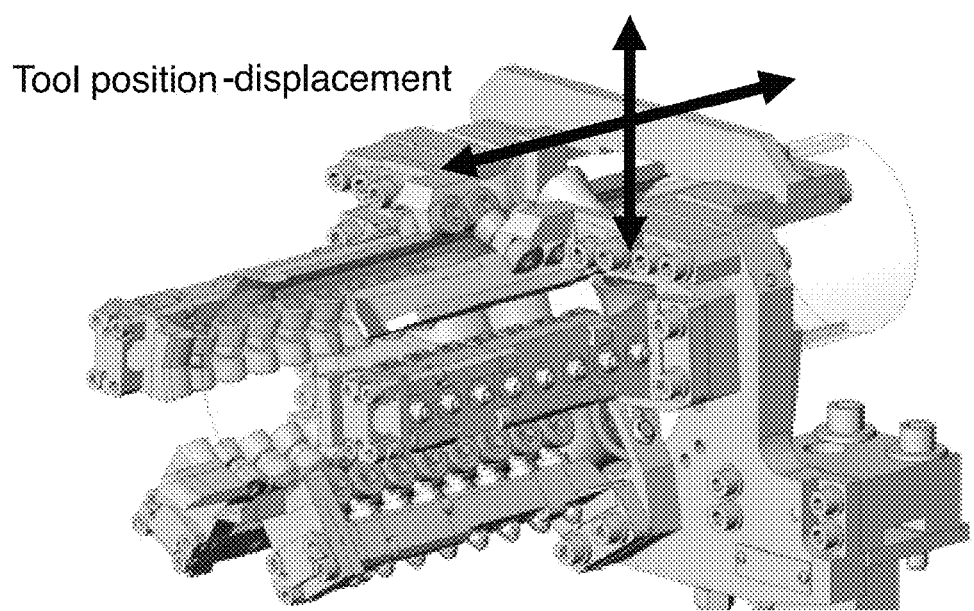
Figure 3C:
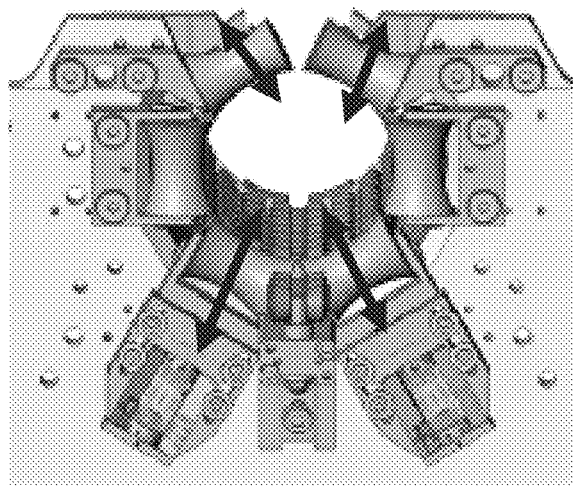
Figure 3D:
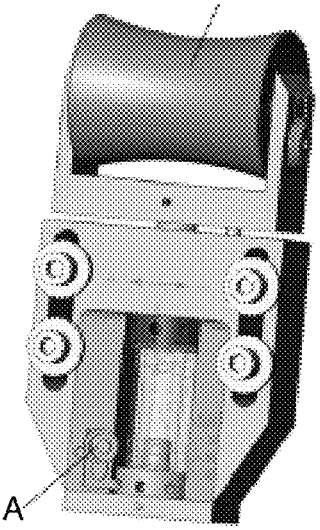
Figure 3E:
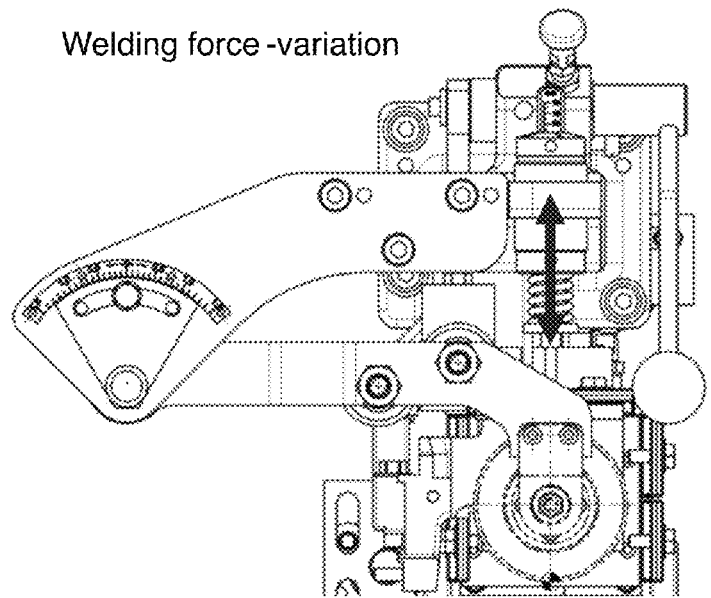

(iii) Calibration rollers of the tool are displaced radially or/and the roller force is varied additionally or in the alternative to the mentioned compensation steps above. The calibration tool is indicated as a symbol that may as well be replaced by a cross in this box of the table of FIG. 3, in the first line and the third column of the table, and also in FIG. 3c. Rollers of the calibration tool act upon the individual body blank during the passage. An adjustment means or an actuator a respectively (for example electromotive or piezo-electrical or pneumatic) is provided for at least one roller of the calibration tool as shown in FIGS. 3 and 3d, at multiple rollers or at all rollers, in order to displace the radial position of the rollers towards the center of the passage and/or to adjust the force by means of which the respective roller acts upon the passing body blank.

(iv) Additionally, or in the alternative, the welding force is varied. This is indicated by the symbol in line 1 and column 4 of the table of FIG. 3 and also FIG. 3e, which may as well be replaced by a simple cross. A support of the upper welding roller of the resistance seam welding machine is indicated in FIG. 3 symbolically instead of a cross. Here, the known adjustment of the welding force is carried out in such a way, that it may be displaced during operation, depending on the disturbance variable.

(v) The welding current is varied in its strength and/or the distance of the welding spots is varied (by varying the frequency of the welding current). This is indicated in FIG. 3 by the symbolically indicated welding current strength adjustment and by the spot distance adjustment also indicated only symbolically. A standard welding current generator for resistance welding machines with such adjustment possibilities is manufactured by the company Soudronic AG, Bergdietikon, Switzerland. Instead of the symbols only a single cross or two crosses can be shown in the table.

The control variables (i) to (v) are adjusted for themselves or in combination by means of a controller which gets a measure for the disturbance variable or the disturbance variables respectively and which adjusts the disturbance variable or the disturbance variables respectively. This is done in such a way, that the influence of the disturbance variable(s) on the quality of the welding seam is diminished or compensated respectively.

The tinning of the edge zone of the metal sheet may be collected as a further disturbance variable. For this, a mark of the edge metal sheets may be provided, which have a deviation of the tinning thickness because of the manufacturing process. This mark is then collected in the rounding apparatus of the device and passed on to the controller. Alternatively, an online measurement of the tinning thickness may be provided in the rounding apparatus. The variation of the welding force and/or the variation of the welding current and/or of the welding spot distance are provided as control variables for the compensation of the disturbance variable tinning. This can be seen in the table by the mentioned symbols (which each may as well be replaced by a simple cross) in line 2 and columns 4 and 5 of the table.

The metal sheet strength (metal sheet thickness) may be collected as a further disturbance variable. The metal sheet strength may be measured in the rounding apparatus in a known way and the measurement value or a deviation from given boundaries is passed to the controller. The variation of the welding force and/or the variation of the welding current and/or of the welding spot distance are provided as control variables for the compensation of the disturbance variable metal sheet strength. This can be seen in the table by the mentioned symbols (which each may as well be replaced by a simple cross) in line 3 and columns 4 and 5 of the table.

The welding range may be collected as a further disturbance variable. The welding range is understood as the range of welding current and/or welding temperature wherein it may be welded in a regular way, such that no so-called "spatters" at the welding seam are produced because of an excess of the welding current or the welding temperature respectively, or such that no unwelded spots along the welding seam are produced because of a fall of the welding current or the welding temperature below required values. The measurement value or a deviation from given boundaries is passed to the controller. The variation of the welding force and/or the variation of the welding current and/or of the welding spot distance are provided as control variables for the compensation of the disturbance variable welding range. This can be seen in the table in line 4 and columns 4 and 5 of the table.

The electrical surface resistance may be collected as a further disturbance variable. This may be measured online, before the welding process, in a known way and the measurement value, or a deviation from given limits for the resistance is passed to the controller. The variation of the welding force and/or the variation of the welding current and/or of the welding spot distance are provided as control variables for the compensation of the disturbance variable surface resistance. This can be seen in the table in line 5 and columns 4 and 5 of the table.

The yield point of the metal sheet material may be collected as a further disturbance variable. The yield point may be measured in the rounding apparatus in a known way and the measurement value or a deviation from given boundaries is passed to the controller. The variation of the welding force and/or the variation of the welding current and/or of the welding spot distance are provided as control variables for the compensation of the disturbance variable yield point. This can be seen in the table in line 6 and columns 4 and 5 of the table.

The overlapping of the body edges may be collected as a further disturbance variable. The overlapping may be measured in the calibration tool by carrying out a force measurement of at least one of the calibration rollers, in order to determine the force with which the calibration roller acts upon the body during its pass through the tool. The measurement value or a deviation from given boundaries is passed to the controller. The variation of the welding force and/or the variation of the welding current and/or of the welding spot distance are provided as control variables for the compensation of the disturbance variable overlapping. This can be seen in the table in line 7 and columns 4 and 5 of the table.

The temperature of the electrodes may be collected as a further disturbance variable. Thereby, the temperature of at least one of the roller electrodes and/or the temperature of the wire electrode running on it may be measured by means of a known temperature measurement installation. The measurement value or a deviation from given limits is passed to the controller. The variation of the welding force and/or the variation of the welding current and/or of the welding spot distance are provided as control variables for the compensation of the disturbance variable temperature of the electrodes. This can be seen in the table in line 8 and column 5 of the table.

The temperature of the calibration tool may be collected as a further disturbance variable. This temperature may be measured in a known way and the measurement value or a deviation from given boundaries is passed to the controller. The variation of the welding force and/or the variation of the welding current and/or of the welding spot distance are provided as control variables for the compensation of the disturbance variable temperature of the calibration.

Characteristics of the electrode wire system, particularly the wire profiling, which are not shown in the table, may be collected as a further disturbance variable. The variation of the welding force and/or the variation of the welding current and/or of the welding spot distance are provided as control variables for the compensation of the disturbance variable wire system. This can be seen in the table in line 9 and column 5 of the table.

The advantages of the invention are particularly a compensation of the changes of influence factors which are relevant for the welding quality by means of an automatic post-adjustment of various control variables. Furthermore, the post-adjustment may take place automatically, thus practically excluding manipulation errors. The downtimes of the manufacturing line are being reduced because manual post-adjustments are eliminated and the efficiency of the machine is augmented.

Thus, at least a disturbance variable which influences the welding quality, particularly errors in cutting the metal sheet, is collected during the manufacturing of container bodies by means of resistance seam welding machines, particularly by means of roller seam resistance welding machines with intermediary wire electrodes. Because of this collection of disturbance variables, at least a control variable is automatically changed in order to compensate or diminish the influence of the disturbance variable on the quality of the welding seam.

The invention claimed is:

1. A device for manufacturing container bodies out of metal sheet comprising:
   a rounding apparatus,
   a conveying arrangement for conveying the container bodies,
   a calibration tool with a plurality of calibration rollers,
   a welding apparatus with adjustable welding current,
   a collection arrangement for collecting at least one disturbance variable having an influence on a welding seam quality during a manufacturing process, and
   a compensation arrangement for compensating for the influence of the at least one disturbance variable on the welding seam quality by means of at least one control variable,
   wherein the collection arrangement is adapted to collect the at least one disturbance variable,
   wherein the at least one disturbance variable comprises at least one of a geometry of an overlapping of an edge of the body blank or a size of the overlapping of the edge of the body blank,
   wherein the compensation arrangement is adapted to adjust the at least one control variable, and
   wherein the at least one control variable comprises at least one of a variation of the welding current or a distance between at least two welding spots.

2. The device according to claim 1, wherein the collection arrangement is further adapted to collect at least one characteristic of a body material of the metal sheet, and
   wherein the at least one disturbance variable further comprises the at least one characteristic of the body material of the metal sheet.

3. The device according to claim 2, wherein the at least one characteristic of the body material of the metal sheet comprises at least one of a geometry of a metal sheet cutting or a presence of brows at the metal sheet cutting.

4. The device according to claim 2, wherein the at least one characteristic of the body material of the metal sheet comprises a tinning of an edge zone of the body blank, and wherein the at least one control variable further comprises a variation of the welding force.

5. The device according to claim 2, wherein the at least one characteristic of the body material of the metal sheet comprises a strength of the metal sheet, and
wherein the at least one control variable further comprises a variation of the welding force.

6. The device according to claim 1, wherein the at least one control variable further comprises at least one of:
a horizontal displacement of a Z-rail influencing the overlapping;
a vertical displacement of the Z-rail influencing the overlapping;
a horizontal displacement of the calibration tool;
a vertical displacement of the calibration tool;
a radial displacement of at least one of the plurality of calibration rollers;
a variation of a roller force acting upon the container bodies; or
a variation of a welding force.

7. The device according to claim 1, wherein the collection arrangement is further adapted to collect a welding temperature range,
wherein the at least one disturbance variable further comprises the welding temperature range, and
wherein the at least one control variable further comprises a variation of the welding force.

8. The device according to claim 1, wherein the collection arrangement is further adapted to collect an electrical surface resistance of the metal sheet,
wherein the at least one disturbance variable further comprises the electrical surface resistance, and
wherein the at least one control variable further comprises a variation of the welding force.

9. The device according to claim 1, wherein the collection arrangement is further adapted to collect at least one rounding characteristic of the metal sheet,
wherein the at least one disturbance variable further comprises the at least one rounding characteristic of the metal sheet, and
wherein the at least one control variable further comprises at least one of an influence on the rounding by a closing or an opening of the rounding apparatus; or
a variation of the welding force.

10. The device according to claim 1, wherein the collection arrangement is further adapted to collect a temperature in the area of the welding process or a temperature of the calibration tool, and
wherein the at least one disturbance variable further comprises at least one of the temperature in the area of the welding process or the temperature of the calibration tool.

11. The device according to claim 1, wherein the conveying arrangement comprises a Z-rail and a head part.

12. The device according to claim 1, wherein the welding apparatus comprises at least one intermediary wire electrode for welding.

13. The device according to claim 12, wherein the collection arrangement is adapted to collect a characteristic of the at least one intermediary wire electrode, and
wherein the at least one disturbance variable further comprises the characteristic of the at least one intermediary wire electrode.

* * * * *